US 6,528,340 B2

(12) United States Patent
Haji-Sheikh et al.

(10) Patent No.: US 6,528,340 B2
(45) Date of Patent: Mar. 4, 2003

(54) PRESSURE TRANSDUCER WITH COMPOSITE DIAPHRAGM

(75) Inventors: Michael J. Haji-Sheikh, Richardson, TX (US); Gilberto Morales, Arlington, TX (US)

(73) Assignee: Honeywell International Inc., Morristown, NJ (US)

(*) Notice: Subject to any disclaimer, the term of this patent is extended or adjusted under 35 U.S.C. 154(b) by 79 days.

(21) Appl. No.: 09/753,834

(22) Filed: Jan. 3, 2001

(65) Prior Publication Data

US 2002/0083775 A1 Jul. 4, 2002

(51) Int. Cl.[7] .......................... H01L 21/00; G01P 15/00; G01P 15/125; G01L 1/04; G01L 1/22
(52) U.S. Cl. ................. 438/53; 73/862.632; 73/514.32; 73/514.01
(58) Field of Search ............................... 438/50, 51, 53; 73/862.632, 514.32, 514.01

(56) References Cited

U.S. PATENT DOCUMENTS

| | | | |
|---|---|---|---|
| 4,867,842 A | | 9/1989 | Bohrer et al. |
| 5,049,460 A | * | 9/1991 | Benecke et al. ............... 430/5 |
| 5,107,309 A | | 4/1992 | Johnson |
| 5,156,052 A | * | 10/1992 | Johnson et al. ............... 73/727 |
| 5,174,156 A | | 12/1992 | Johnson et al. |
| 5,225,377 A | * | 7/1993 | Hines et al. ................. 437/228 |
| 5,245,504 A | | 9/1993 | Bullis et al. |
| 5,344,523 A | * | 9/1994 | Fung et al. .................. 156/628 |
| 5,360,521 A | | 11/1994 | Davis et al. |
| 5,412,994 A | | 5/1995 | Cook et al. |
| 5,583,296 A | | 12/1996 | Mokwa et al. |
| 5,672,551 A | * | 9/1997 | Fung .......................... 437/228 |
| 5,792,958 A | | 8/1998 | Speldrich |
| 5,949,118 A | * | 9/1999 | Sakai et al. .................. 257/419 |
| 6,006,607 A | * | 12/1999 | Bryzek et al. ................ 73/727 |
| 6,093,579 A | | 7/2000 | Sathe |
| 6,140,143 A | | 10/2000 | Christel et al. |
| 6,293,149 B1 | * | 9/2001 | Yoshida et al. ............. 73/514.01 |
| 6,184,561 B1 | * | 2/2002 | Tanaka et al. ............... 257/417 |

FOREIGN PATENT DOCUMENTS

| | | |
|---|---|---|
| JP | 09 008326 | 1/1997 |
| JP | 10 132682 | 5/1998 |

OTHER PUBLICATIONS

Patent Cooperation Treaty, International Search Report, Jun. 5, 2002, 3 pages plus cover sheets.

* cited by examiner

Primary Examiner—John F. Niebling
Assistant Examiner—Viktor Simkovic
(74) Attorney, Agent, or Firm—Kris T. Fredrick

(57) ABSTRACT

A method of forming a composite diaphragm for a pressure transducer is disclosed. The method comprises providing a substrate layer having a first conductivity type and a first surface. Positive implants are deposited in the first surface of the substrate layer, and an epitaxial layer is grown on the first surface of the substrate layer so that the positive implants form positive diffusions in the epitaxial layer. An oxide pattern is formed on the epitaxial layer, and a top layer is deposited over the epitaxial layer and oxide pattern. The substrate layer and positive diffusions of the epitaxial layer are then etched to form the composite diaphragm. The positive diffusions can be patterned so that the resulting etched structure has improved diaphragm performance characteristics. For example, the remaining pattern can include a plurality of bosses and interconnecting battens so that the diaphragm has a relatively high burst pressure and a high output signal with improved linearity at low pressures.

20 Claims, 3 Drawing Sheets

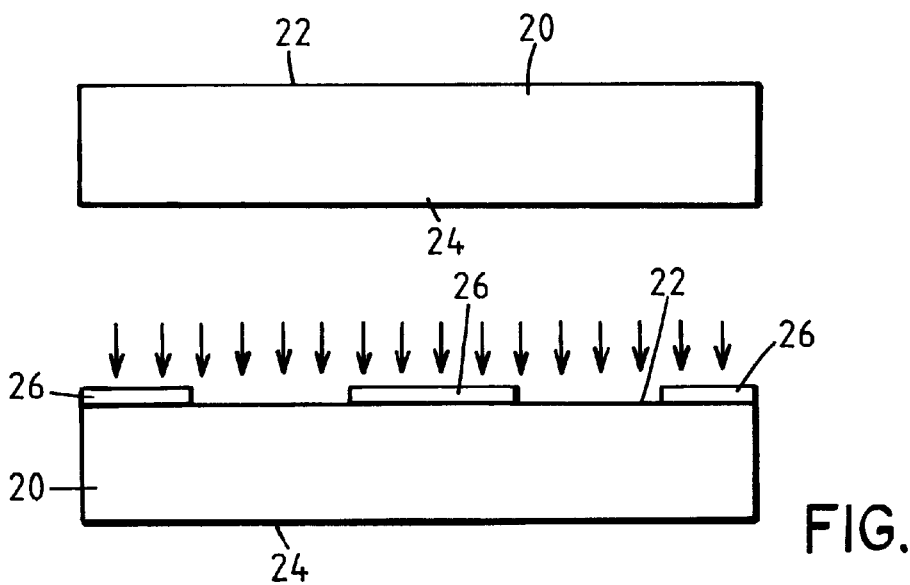
FIG. 2A
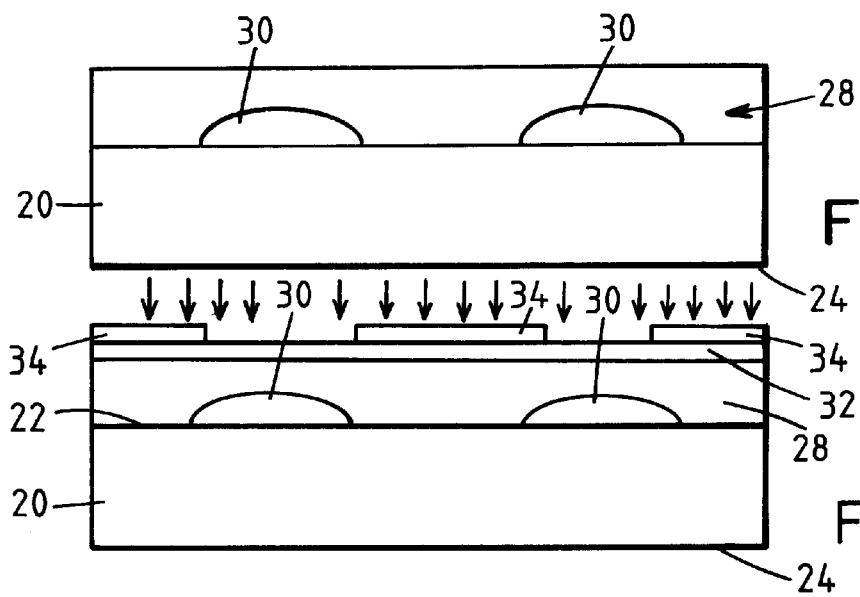
FIG. 2B
FIG. 2C
FIG. 2D
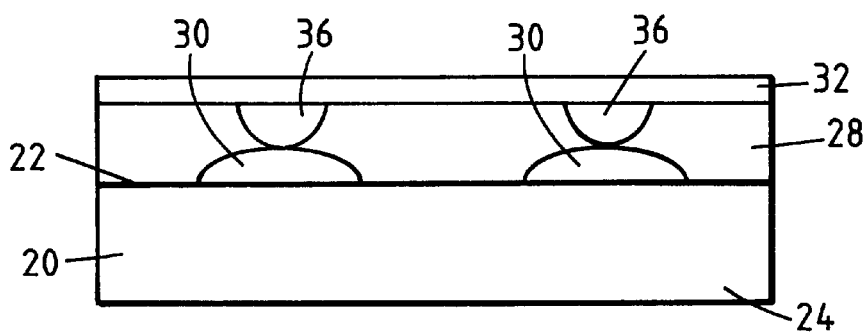
FIG. 2E

PRESSURE TRANSDUCER WITH COMPOSITE DIAPHRAGM

FIELD OF THE INVENTION

The present invention generally relates to pressure transducers and, more particularly, to the diaphragm portions of such transducers.

BACKGROUND OF THE INVENTION

Pressure transducers that use piezoresistors are well known in the art. Generally, such transducers are formed with a silicon substrate and an epitaxial layer, which is grown on the substrate. A portion of the substrate is removed, leaving a thin, flexible diaphragm portion. The piezoresistors are located in the diaphragm portion to form a pressure transducer.

In operation, at least one surface of the diaphragm is exposed to a process pressure. The diaphragm deflects according to the magnitude of the pressure, and this deflection bends the attached piezoresistors. Bending of the diaphragm creates changes in the resistance value of the piezoresistors, which is reflected as a change in the output voltage signal of a resistive bridge formed at least partially by the piezoresistors.

The substrate and epitaxial layers are commonly formed of single crystal silicon. Diaphragm portions formed of single crystal silicon produce adequate results for pressures ranging from five inches $H_2O$ to 6,000 PSI. Such material does not, however, produce a high output signal with sufficient linearity at pressures below 5 inches $H_2O$.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with certain aspects of the present invention, a method of forming a composite diaphragm for a pressure transducer or similar device is provided. The method comprises providing a substrate layer having a first conductivity type, the substrate layer having a first surface. Positive implants are deposited in the first surface of the substrate layer, and an epitaxial layer is grown on the first surface of the substrate layer so that the positive implants form positive diffusions in the epitaxial layer. An oxide pattern is formed on the epitaxial layer, and a top layer is deposited over the epitaxial layer and oxide pattern. The substrate layer and positive diffusions of the epitaxial layer are etched to form the composite diaphragm.

In accordance with additional aspects of the present invention, a composite diaphragm is provided for use in a pressure sensor or like device. The diaphragm comprises a first layer of silicon nitride and a second layer attached to the silicon nitride layer and comprising a pressure sensor pattern of silicon material.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIGS. 2A–2G illustrate various steps during the fabrication of the pressure transducer.

It should be understood that the drawings are not necessarily to scale and that the embodiments are illustrated using graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 1:
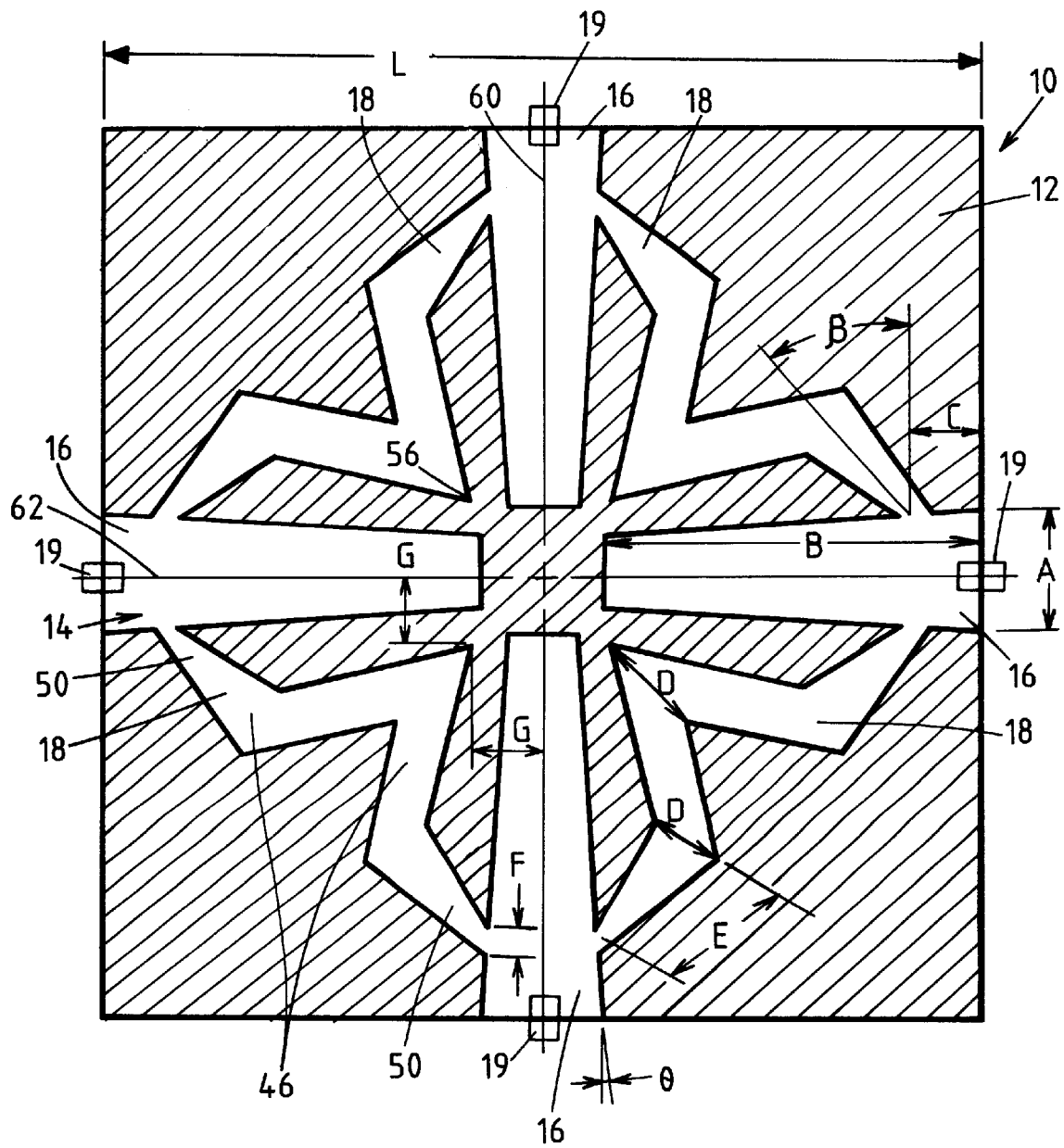
FIG. 1 is a bottom view of a diaphragm portion of the pressure transducer illustrating a preferred boss and batten structure.

Referring initially to FIG. 1, a bottom view of a diaphragm 10 for a pressure transducer is shown. The diaphragm 10 includes a layer 12 of first diaphragm material formed in a solid square having a length "L" on each side. A second patterned layer 14 of diaphragm material is attached to the first layer 12. As illustrated in FIG. 1, the second layer 14 comprises four bosses 16 interconnected by four battens 18. While the boss and batten structure shown in FIG. 1 is preferred, it will be appreciated that a variety of different patterns can be formed in accordance with the present invention. Piezoresistors 19 are attached to the second layer 14 at the base of each boss 16.

Figure 2F:
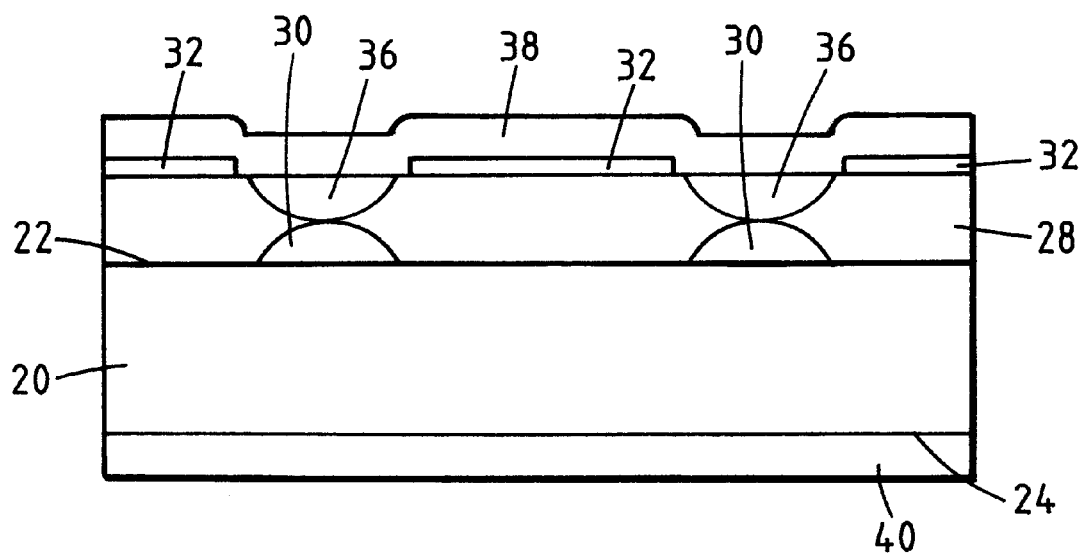

To form the pressure transducer diaphragm 10 shown in FIG. 1, the steps depicted in FIGS. 2A–2G are followed. FIG. 2A shows the formation of a substrate 20 having a top surface 22 and a bottom surface 24. The substrate 20 can be formed in a variety of known manners and can comprise any one of a variety of known substrate materials. In the preferred embodiment, the substrate comprises single crystal silicon doped with a p-type material.

In FIG. 2B, the top surface 22 of the substrate 20 is coated with a photo resist pattern 26. A p-type material is then directed toward the top surface 22, such as with an ion implanter, so that the exposed areas of the top surface 22 receive the p-type material. The photo resist layer 26 is removed and an n-type epitaxial layer 28 is grown on the top surface 22, as best shown in FIG. 2C. The areas of the top surface 22 that were exposed during the p-type implant create p-type diffusions 30 in the n-type epitaxial layer 28.

As shown in FIG. 2D, an oxide layer 32 is deposited over the epitaxial layer 28, and a second photo resist layer 34 is patterned on the oxide layer 32. The photo resist layer 34 and exposed areas of the oxide layer 32 are bombarded with a p-type material to create p-type diffusions 36 in the epitaxial layer 28, as best shown in FIG. 2E. A top layer of diaphragm material 38 is deposited on top of the oxide layer 32, and a bottom layer of diaphragm material 40 is deposited over the bottom layer 24 of the substrate 20 (FIG. 2F). In the preferred embodiment, the top layer 38 and bottom layer 40 comprise silicon nitride. The top and bottom layers 38, 40 can be deposited in a known manner, such as by chemical vapor deposition, plasma deposition, or RF sputtering.

The composite structure is then etched so that the p-type diffusions 30, 36 and much of the substrate 20 are removed. During the etching step, the composite structure is preferably placed in a tank of etchant and a stop-etch process is used to remove the p-type material. A stop-etch process is described in commonly assigned U.S. Pat. No. 5,360,521, which is incorporated herein by reference.

Figure 2G:
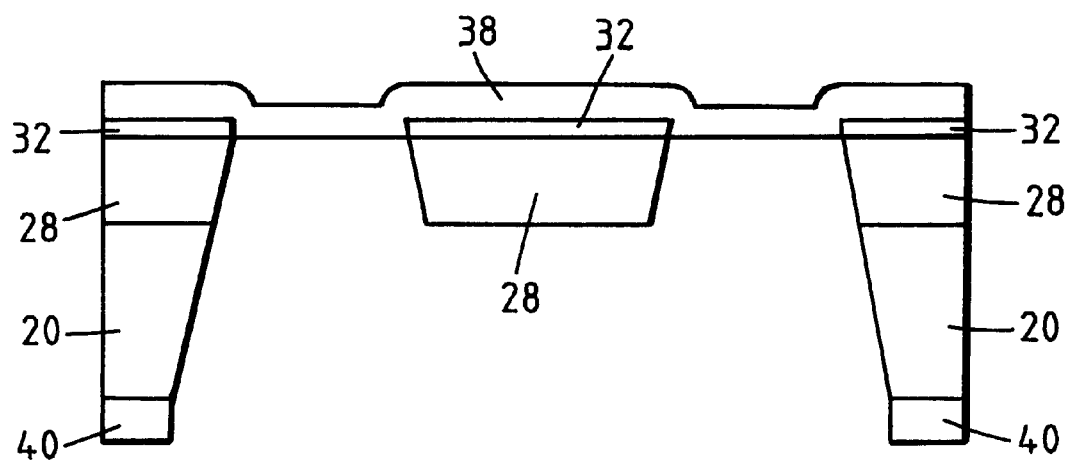

After the etching step, the structure shown in FIG. 2G remains. As shown therein, the top layer 38 has a substantially uniform thickness across the entire diaphragm, with remaining portions of the n-type epitaxial layer 28 attached to the top layer 38. In the illustrated embodiment, the top layer 38 corresponds to the first layer of diaphragm material 12 shown in FIG. 1. Similarly, the epitaxial layer 28 corresponds to the patterned layer 14, where the remaining portions of the layer 28 form the bosses 16 and battens 18. It will be appreciated, however, that any desirable pattern can be formed in addition to the preferred boss and batten pattern illustrated at FIG. 1. The remaining substrate and bottom layers 20, 40 provide structure for mounting the diaphragm 10 as necessary.

The resulting transducer structure provides a diaphragm having a composite construction that can be adapted to particular design specifications. The boss and batten pattern illustrated at FIG. 1 produces a high output signal with good linearity at low pressure levels, such as 5 inches $H_2O$. Each boss 16 is formed with an outside width "A" and a length "B." The battens 18 intersect each associated boss 16 at an edge distance "C." Each batten 18 comprises a pair of angled leg portions 46 having a width "D" and a pair of connecting portions 50 having a length "E." Each connecting portion 50 has a width "F" at the point of intersection with an associated boss 16. The leg portions 46 intersect at a point 56 that is an equal distance "G" from center lines 60, 62 of the bosses 16. Each connecting portion 50 intersects in an associated 16 at an angle "$\beta$". Furthermore, each boss 16 is preferably tapered at an angle "$\theta$".

In a representative boss and batten embodiment, A is 200 $\mu$m, B is 560 $\mu$m, C is 180 $\mu$m, D is 115 $\mu$m, E is 225 $\mu$m, F is 15 $\mu$m, G is 180 $\mu$m, L is 1400 $\mu$m, $\beta$ is 60 degrees, and $\theta$ is 6 degrees. The top layer 38 is preferably approximately 2.0 $\mu$m and the intermediate layer 30 is approximately 10.5 $\mu$m, for an overall diaphragm thickness of approximately 12.5 $\mu$m. Each of these dimensions can be adjusted to vary the performance characteristics of the diaphragm 10. For example, the span, defined herein as the algebraic difference between limits of the pressure range, can be increased by decreasing the boss outside width "A," the leg portion width "D," the connecting portion with "F," the intersection point distance "G," and the intersect angles "$\beta$," or by increasing the edge distance "C," the connecting portion length "E," and the boss taper angle "$\theta$." Furthermore, a terminal base linearity of the diaphragm 10 can be decreased by decreasing the boss outside width "A," the boss length "B," the connecting portion length "E," and the boss taper angle "$\theta$," or by increasing the edge distance "C," leg portion width "D," connecting portion width "F," intersection point distance "G," and intersect angle "$\beta$." Furthermore, it will be appreciated that the span and terminal base linearity will increase as the length "L" of the diaphragm increases.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive nor to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method of forming a composite diaphragm for a pressure sensor, the method comprising:
   providing a substrate layer having a first conductivity type, the substrate layer having a first surface;
   depositing implants in the first surface of the substrate layer;
   growing an epitaxial layer on the first surface of the substrate layer, the implants forming diffusions in the epitaxial layer;
   forming an oxide pattern on the epitaxial layer;
   depositing a top layer over the epitaxial layer and oxide pattern; and
   etching the substrate layer and diffusions of the epitaxial layer to form the composite diaphragm.

2. The method of claim 1, wherein the implants are positive implants and the diffusions are positive diffusions.

3. The method of claim 1, in which the substrate layer comprises a p-type single crystal silicon material.

4. The method of claim 1, in which the positive implants are deposited using an ion implanter.

5. The method of claim 1, in which the top layer comprises silicon nitride.

6. The method of claim 5, in which the substrate layer comprises a p-type single crystal silicon material.

7. The method of claim 1, in which the etching step comprises a stop-etch process.

8. The method of claim 2, in which portions of the epitaxial layer not formed with the positive diffusions form a pattern.

9. The method of claim 8, in which the pattern comprises a plurality of bosses.

10. The method of claim 9, in which the pattern further comprises a plurality of battens extending between adjacent bosses.

11. The method of claim 10, in which the substrate layer comprises a p-type single crystal silicon material.

12. The method of claim 10, in which the top layer comprises silicon nitride.

13. The method of claim 12, in which the substrate layer comprises a p-type single crystal silicon material.

14. A method of forming a composite diaphragm for a pressure sensor, the method comprising:
   providing a substrate layer having a first conductivity type, the substrate layer having a first surface;
   depositing positive implants in the first surface of the substrate layer;

growing an epitaxial layer on the first surface of the substrate layer, the positive implants forming positive diffusions in the epitaxial layer;

forming an oxide pattern on the epitaxial layer;

depositing a silicon nitride layer over the epitaxial layer and oxide pattern; and etching the substrate layer and positive diffusions of the epitaxial layer to form the composite diaphragm.

15. The method of claim 1 wherein the top layer comprises at least first and second edges, wherein the method further comprises forming a first piezoresistor on the top layer at the first edge and a second piezoresistor on the top layer at the second edge, and wherein the etching of the substrate layer and diffusions of the epitaxial layer comprises etching the substrate layer and the diffusions of the epitaxial layer so as to leave an epitaxial pattern of epitaxial material that transfers forces from the top layer to the first and second piezoresistors.

16. The method of claim 15 wherein the epitaxial pattern comprises at least first and second bosses, wherein the first boss extends across the top layer to the first piezoresistor, wherein the second boss extends across the top layer to the second piezoresistor, and wherein the epitaxial pattern further comprises at least one batten intersecting the first and second bosses.

17. The method of claim 16 wherein the batten comprises three non-parallel sections.

18. The method of claim 14 wherein the silicon nitride layer comprises at least first and second edges, wherein the method further comprises forming a first piezoresistor on the silicon nitride layer at the first edge and a second piezoresistor on the silicon nitride layer at the second edge, and wherein the etching of the substrate layer and positive diffusions of the epitaxial layer comprises etching the substrate layer and the positive diffusions of the epitaxial layer so as to leave an epitaxial pattern of epitaxial material that transfers forces from the silicon nitride layer to the first and second piezoresistors.

19. The method of claim 18 wherein the epitaxial pattern comprises at least first and second bosses, wherein the first boss extends across the silicon nitride layer to the first piezoresistor, wherein the second boss extends across the silicon nitride layer to the second piezoresistor, and wherein the epitaxial pattern further comprises at least one batten intersecting the first and second bosses.

20. The method of claim 19 wherein the batten comprises three non-parallel sections.

* * * * *